United States Patent
Cox et al.

(10) Patent No.: US 7,445,189 B2
(45) Date of Patent: Nov. 4, 2008

(54) APPARATUS AND METHOD FOR AUTOMATICALLY MAINTAINING THE VIEWING ANGLE OF A CUSTOMER DISPLAY

(75) Inventors: Aaron Roger Cox, Tucson, AZ (US); Thomas John Sluchak, Apex, NC (US); Robert Paul Tennant, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/467,459

(22) Filed: Aug. 25, 2006

(65) Prior Publication Data

US 2008/0048085 A1 Feb. 28, 2008

(51) Int. Cl.
*F16M 13/00* (2006.01)
(52) U.S. Cl. .............. 248/415; 248/123.2; 248/289.11; 248/919
(58) Field of Classification Search .......... 248/664, 248/665, 130, 131, 289.11, 291.1, 919, 922, 248/415; 361/681
See application file for complete search history.

(56) References Cited

U.S. PATENT DOCUMENTS

| | | | | | |
|---|---|---|---|---|---|
| 5,687,939 | A | * | 11/1997 | Moscovitch | 248/122.1 |
| 6,222,507 | B1 | * | 4/2001 | Gouko | 345/1.1 |
| 6,343,006 | B1 | * | 1/2002 | Moscovitch et al. | 361/681 |
| 6,532,146 | B1 | * | 3/2003 | Duquette | 361/681 |
| 7,061,754 | B2 | * | 6/2006 | Moscovitch | 361/683 |
| 7,142,415 | B2 | * | 11/2006 | Hillman et al. | 361/681 |
| 2006/0198094 | A1 | * | 9/2006 | Kano et al. | 361/683 |

* cited by examiner

*Primary Examiner*—Ramon O Ramirez
(74) *Attorney, Agent, or Firm*—Kunzler & McKenzie

(57) ABSTRACT

An apparatus and method is disclosed for automatically maintaining the viewing angle of a first display, mounted to a second display, regardless of the viewing angle of the second display. In one embodiment, such an apparatus includes a first display and a pivot mechanism to connect the first display to a second display. The pivot mechanism enables the first display to pivot relative to the second display. An angle retention mechanism is provided to automatically maintain the viewing angle of the first display regardless of the viewing angle of the second display.

6 Claims, 2 Drawing Sheets

APPARATUS AND METHOD FOR AUTOMATICALLY MAINTAINING THE VIEWING ANGLE OF A CUSTOMER DISPLAY

BACKGROUND OF THE INVENTION

1. Field of the Invention

This invention relates to customer displays and more particularly to apparatus and methods for automatically maintaining the viewing angle of customer displays.

2. Description of the Related Art

Modern point-of-sale (POS) systems are used extensively in retail establishments to facilitate payment for products and services. These systems typically employ a variety of hardware and software components such as POS terminals at the checkout locations of these establishments. As today's electronic hardware becomes smaller and more powerful, there is a corresponding need to offer point-of-sale (POS) hardware that is more compact and occupies as little counter space as possible.

For example, one growing trend is the use of flat displays, such LCD panels, at the checkout area for use as the clerk's display device. A related trend is to mount a customer display device on the back of a clerk's display device. This is an effective way to shrink the footprint of a POS terminal to efficiently utilize space. This is also a good location from the customer's point of view because it places the display high enough to be seen over ledges, barriers, or other obstructions on or around a checkout countertop. It also makes the display easier to view by placing it closer to the customer's eyes. Furthermore, positioning the displays back-to-back is often the optimal arrangement for many retail and food service checkout counters.

Typically, a clerk's display uses a pivot hinge to enable adjustment of the display to an optimal viewing angle for a range of user heights. The viewing angle of the clerk's display may be adjusted many times a day as different clerks take turns at the checkout counter or change shifts. However, this also typically changes the viewing angle of the customer display. Because this angle is frequently changing, the customer display is often positioned at a poor or less than optimal viewing angle. Further, it is impractical to expect a clerk or customer to constantly adjust the customer display to a more optimal angle.

In view of the foregoing, what is needed is an apparatus for automatically maintaining the viewing angle of a customer display when adjusting the viewing angle of a clerk's display. Ideally, such an apparatus would be simple, have few moving parts, and be adaptable to a wide variety of display types.

SUMMARY OF THE INVENTION

The present invention has been developed in response to the present state of the art, and in particular, in response to the problems and needs in the art that have not yet been fully solved by currently available apparatus and methods. Accordingly, the present invention has been developed to provide an apparatus and method for automatically maintaining the viewing angle of a first display, mounted to a second display, regardless of the viewing angle of the second display. In one embodiment, an apparatus in accordance with the invention includes a first display and a pivot mechanism to connect the first display to a second display. This pivot mechanism enables the first display to pivot relative to the second display. An angle retention mechanism is provided to automatically maintain the viewing angle of the first display regardless of the viewing angle of the second display.

In selected embodiments, the angle retention mechanism relies on gravity to maintain the viewing angle of the first display. For example, the angle retention mechanism may include a weight, coupled to the first display, to maintain the viewing angle of the first display by the force of gravity exerted thereon. In other embodiments, the angle retention mechanism relies on a mechanical device to maintain the viewing angle of the first display. For example, an angle retention mechanism may utilize a crank and arm to maintain the viewing angle of the first display regardless of the viewing angle of the second display.

In another aspect of the invention, a method for automatically maintaining the viewing angle of a display includes providing a first display mounted to and pivotally connected to a second display. The method then includes setting the viewing angle of the first display. The method then includes adjusting the viewing angle of the second display and automatically maintaining the viewing angle of the first display regardless of the viewing angle of the second display.

In selected embodiments, the above-stated method includes maintaining the viewing angle of the first display using gravity. In other embodiments, the method includes maintaining the viewing angle of the first display using a mechanical device.

The present invention provides novel apparatus and methods for automatically maintaining the viewing angle of a first display mounted to a second display. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1A:
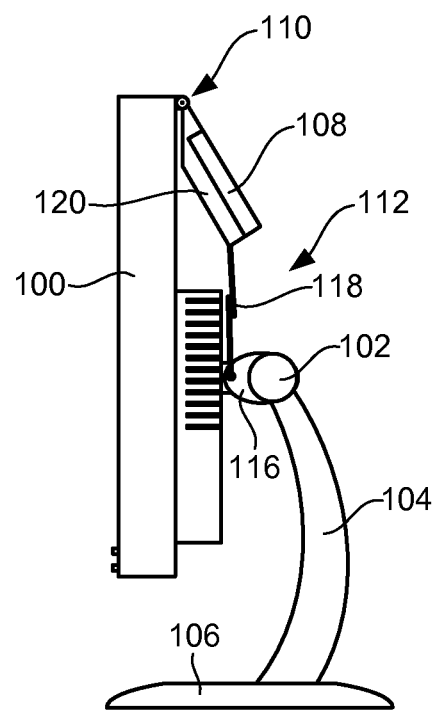
FIGS. 1A through 1C illustrate various views of one embodiment of a mechanically-based apparatus for maintaining the viewing angle of a customer display mounted to a clerk's display.

Referring to FIG. 1, as previously mentioned, a clerk's display 100 may include various types of displays for use at or near the checkout area or counter of a retail or food service establishment. Such a display 100 may include, for example, a flat panel display 100, such as the illustrated LCD panel 100. Nevertheless, the apparatus and methods disclosed herein may be used with wide variety of displays, including but not limited to CRT, LCD, plasma, touch screen, or other types of displays. To enable adjustment of the viewing angle of the clerk's display 100, the display 100 may include a hinge 102 or pivot 102 allowing the display 100 to tilt or pivot. The display 100 may be held up and stabilized by a support 104 coupled to a base 106.

To shrink the footprint of a POS terminal and make it easier for the customer to view, a customer display 108 may be mounted to the clerk's display 100, such as to the back of the clerk's display 100. Such a customer display 108 may be used to display information related to a particular transaction, such as, for example, payment amount, products purchased, payment options, and the like. A pivot mechanism 110, such as a hinge 110, may be used to connect the customer display 108 to the clerk's display 100 and enable pivoting therebetween. This enables the viewing angle of the customer display 108 to be adjusted independently of the clerk's display 100.

Because the customer display 108 is mounted to the clerk's display 100, a change of viewing angle of the clerk's display 100 will also change the viewing angle of the customer display 108. This is particularly problematic in that it requires a clerk to readjust the viewing angle of the customer display 108 every time he or she adjusts the angle of the clerk's display 100.

To overcome this problem, an angle retention mechanism 112 may be provided to maintain the viewing angle of the customer display 108 while adjusting the viewing angle of the clerk's display 100. In one embodiment, an angle retention mechanism 112 may mechanically adjust the angle of the customer display 108, relative to the clerk's display 100, in response to an adjustment of the viewing angle of the clerk's display 100. For example, an angle retention mechanism 112 may, in certain embodiments, include a crank 116 (in this embodiment shaped like a cam 116) pivoting about an axis, such as the axis of the hinge 102 or pivot 102. An arm 118 may extend from the crank 116 to the customer display 108.

Figure 1B:
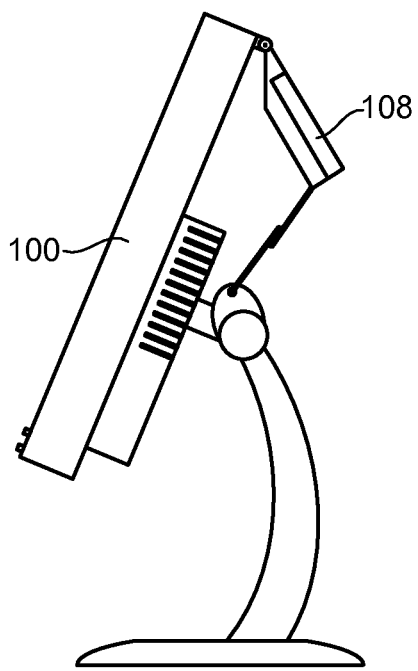
Figure 1C:
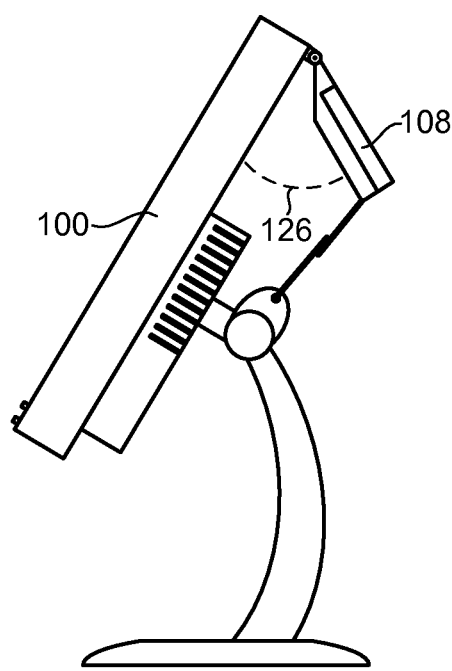

Upon adjusting (i.e., tilting) the clerk's display 100, the crank 116 rotates, using gears or other means, to selected positions based on the viewing angle of the clerk's display 100. As the crank 116 rotates, the arm 118 is urged toward the customer display 108 causing the display 108 to pivot with respect to the clerk's display 100. Thus, although the viewing angle of the clerk's display 100 changes, the crank 116 and arm 118 maintain the viewing angle of the customer display 108. FIGS. 1B and 1C show the continuing movement and rotation of the customer display 108 relative to the clerk's display 100 as the clerk's display 100 tilts to various positions. FIG. 1C shows the crank 116 and arm 118 fully extended to maximize the angle 126 between the customer display 108 and the clerk's display 100.

In selected embodiments, an angle adjustment mechanism may be provided to initially set the viewing angle of the customer display 108. For example, in one embodiment, the arm 118 may be an adjustable arm 118. This adjustable arm 118 may be either lengthened or shortened to initially set the viewing angle of the customer display 108. In other embodiments, the customer display 108 may pivot relative to a structure 120 using a friction hinge as will be explained in more detail in the description associated with FIGS. 2A through 2C. The friction hinge may enable the customer display 108 to be initially set and maintained at a desired viewing angle.

Figure 2A:
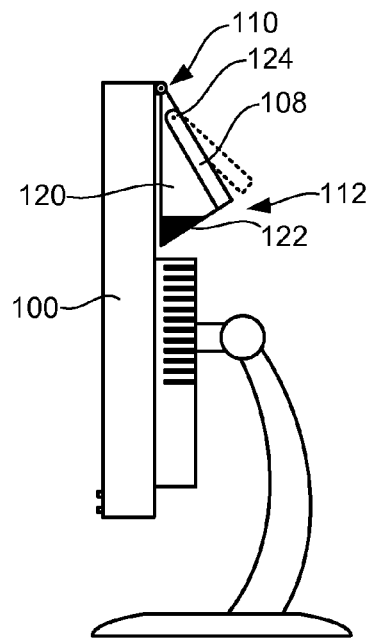
FIGS. 2A through 2C illustrate various views of one embodiment of a gravity-based apparatus for maintaining the viewing angle of a customer display mounted to a clerk's display.

Referring to FIG. 2A, in another embodiment, an angle retention mechanism 112 may use gravity to maintain the viewing angle of the customer display 108. For example, in one embodiment, a weight 122 may be coupled to the customer display 108 or other structure 120, which may hang from a free swinging pivot mechanism 110. This weight 122 maintains the customer display 108 at a desired angle depending on the position and orientation of the weight 122.

Figure 2B:
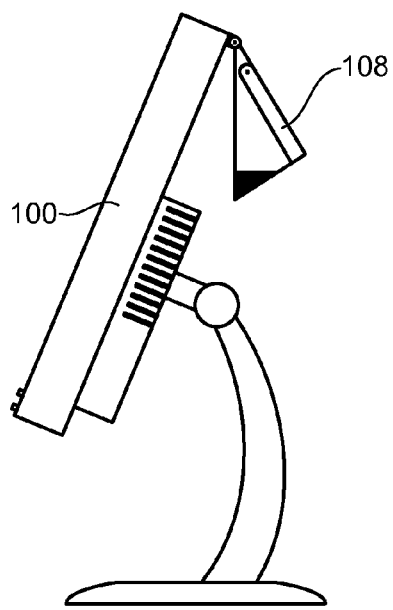
Figure 2C:
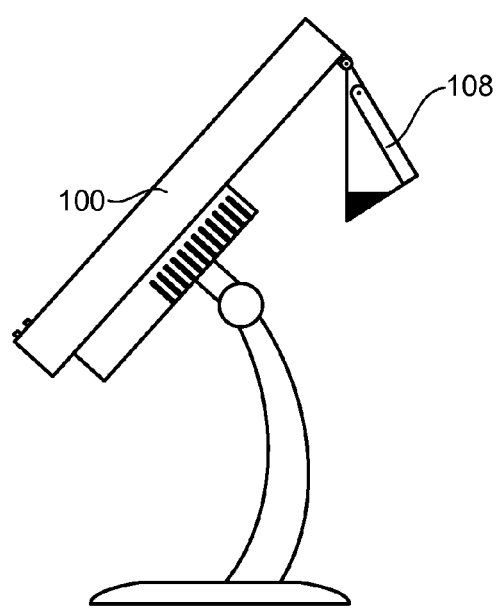

Upon adjusting the viewing angle of the clerk's display 100, the customer display 108 maintains the same orientation due to the force and orientation of gravity on the at weight 122. FIGS. 2B and 2C show the consistent orientation of the customer display 108 as the viewing angle of the clerk's display 100 changes. One potential advantage of the gravity-based configuration of FIG. 2A is that the viewing angle of the customer display 108 may be maintained regardless of the viewing angle of the clerk's display 100. That is, the gravity-based configuration does not reach a limit as does the mechanical configuration in FIG. 1C—i.e., when the crank 116 and arm 118 are fully extended. On the other hand, the customer display 108 shown in FIGS. 1A through 1C may be more stable (i.e., less subject to swinging) than the customer display 108 in the gravity-based configuration shown in FIGS. 2A through 2C.

As mentioned, in selected embodiments, the customer display 108 may be set initially using a friction hinge 124 or other similar device, as is used on many laptop computers. After the initial angle is selected, the weight 122 may be used to maintain the viewing angle of the customer display 108. The angle retention mechanism shown in FIGS. 1A through 2C, although described with respect to displays used in retail or food service environments, is not limited to such environments. Thus, the apparatus and methods described herein may be readily applied to other environments not disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically maintaining the viewing angle of a first display, mounted to a second display, regardless of the viewing angle of the second display, the apparatus comprising:
   a first display supported by a second display;
   a pivot mechanism pivotally connecting the first display to the second display and the first display to pivot relative to the second display; and
   an angle retention mechanism comprising a weight coupled to the first display configured to automatically maintain the viewing angle of the first display regardless of the viewing angle of the second display by the force of gravity exerted on the weight.

2. The apparatus of claim 1, wherein the angle retention mechanism relies on a mechanical device to maintain the viewing angle of the first display.

3. The apparatus of claim 2, wherein the angle retention mechanism utilizes a crank and arm to maintain the viewing angle of the first display by adjusting the angle of the first display relative to the second display.

4. The apparatus of claim 1, further comprising an angle adjustment mechanism to initially set the viewing angle of the first display.

5. A method for automatically maintaining the viewing angle of a first display, mounted to a second display, regardless of the viewing angle of the second display, the method comprising:

provinding a first display supported by and pivotally connected to a second display;

setting the viewing angle of the first display;

adjusting the viewing angle of the second display; and automatically maintaining, without user intervention, the viewing angle of the first display regardless of the viewing angle of the second display using a weight coupled to the first display by force of gravity exerted on the weight.

6. The method of claim 5, wherein automatically maintaining comprises maintaining the viewing angle of the first display using a mechanical device.

* * * * *